(12) United States Patent
Menache et al.

(10) Patent No.: US 9,349,204 B1
(45) Date of Patent: May 24, 2016

(54) SYSTEMS AND METHODS FOR GENERATING VIDEOS USING ANIMATION AND MOTION CAPTURE SCENE INFORMATION

(71) Applicant: House of Moves, Inc., Los Angeles, CA (US)

(72) Inventors: Alberto Menache, Los Angeles, CA (US); Kilo Akuna, Los Angeles, CA (US)

(73) Assignee: HOUSE OF MOVES, INC., Los Angeles, CA (US)

( * ) Notice: Subject to any disclaimer, the term of this patent is extended or adjusted under 35 U.S.C. 154(b) by 0 days.

(21) Appl. No.: 14/821,605

(22) Filed: Aug. 7, 2015

(51) Int. Cl.
| | |
|---|---|
| *G06T 13/40* | (2011.01) |
| *G06T 17/10* | (2006.01) |
| *G06K 9/00* | (2006.01) |
| *G06T 7/20* | (2006.01) |
| *G06F 3/0481* | (2013.01) |
| *G06T 7/00* | (2006.01) |

(52) U.S. Cl.
CPC ............ *G06T 13/40* (2013.01); *G06F 3/04815* (2013.01); *G06K 9/00342* (2013.01); *G06T 7/0071* (2013.01); *G06T 7/2046* (2013.01); *G06T 17/10* (2013.01); *G06T 2200/04* (2013.01); *G06T 2200/12* (2013.01); *G06T 2207/10016* (2013.01); *G06T 2207/10024* (2013.01); *G06T 2207/10028* (2013.01); *G06T 2207/10152* (2013.01); *G06T 2207/20016* (2013.01); *G06T 2207/30196* (2013.01); *G06T 2210/61* (2013.01)

(58) Field of Classification Search
CPC . G06F 3/04842; G06T 19/00; G06T 2200/24; G06T 13/20; G06T 15/00; G06T 13/00; G06T 13/40; G06T 2207/10016; G06T 7/20; G06T 7/2046
See application file for complete search history.

(56) References Cited

U.S. PATENT DOCUMENTS

| | | | |
|---|---|---|---|
| 8,547,396 B2 | 10/2013 | Jung | |
| 8,643,778 B1 * | 2/2014 | Singh | G11B 27/034 348/452 |
| 2009/0237489 A1 * | 9/2009 | Tsugane | H04N 7/147 348/14.12 |
| 2012/0028707 A1 | 2/2012 | Raitt et al. | |
| 2013/0120422 A1 | 5/2013 | Rao et al. | |

OTHER PUBLICATIONS

Beginners Guide Maya, 2005, downloaded Sep. 23, 2015 from http://www.cs.vu.nl/~eliens/demo/@archive/games/maya-tutorial.pdf.*
Gupta et al., MotionMontage: A System to Annotate and Composite Motion Takes for 3D Animations, CHI 2014, Apr. 26-May 1, 2014, Toronto, ON, Canada.*

* cited by examiner

*Primary Examiner* — Haixia Du
(74) *Attorney, Agent, or Firm* — Sheppard Mullin Richter & Hampton LLP (57) ABSTRACT

Scene information describing a three-dimensional virtual space and/or virtual objects within the virtual space may be used to generate an animated video. A user interface may be presented to a user. The user interface may be configured to receive user entry and/or selection of parameter values for one or more video parameters. The user-provided parameter values may facilitate one or more of determining frames of the video, rendering images for the frames, generating a video using the rendered images, and/or other operations.

20 Claims, 6 Drawing Sheets

SYSTEMS AND METHODS FOR GENERATING VIDEOS USING ANIMATION AND MOTION CAPTURE SCENE INFORMATION

FIELD OF THE DISCLOSURE

This disclosure relates to generating videos using animation and motion capture scene information.

BACKGROUND

Production of animated videos may include the generation of three-dimensional models of virtual spaces. The virtual space may be used to tell a story using one or more virtual objects that may be placed within the virtual space. The virtual objects may represent characters, topographical elements, and/or other objects within the virtual space. Virtual objects may be animated in accordance with a storyline, plot, action sequence, character dialogue, and/or other video content of the animated video. To generate the video, two-dimensional images may be generated from the three-dimensional model at various points in time. The images may be compiled together to comprise frames of the video.

In some instances, motion of virtual objects may be based on motion capture techniques. These techniques may capture motion of a real-world object (e.g., a human actor) and translate that motion to movement of a virtual object within the virtual space.

SUMMARY

One aspect of the disclosure relates to a system configured for generating videos using animation and/or motion capture scene information. Scene information may include spatial information, temporal information, and/or other information. Spatial information may include positions and/or orientations of virtual objects in a three-dimensional virtual space over time, and/or other information. Temporal information may include a timeline corresponding to the positions and/or orientations of the virtual objects, and/or other information. By way of non-limiting example, a given position and/or orientation of a given virtual object may be known at a given time instance along the timeline. At least some of the scene information may be determined from motion capture of one or more real-world objects corresponding to one or more of the virtual objects.

The system may include one or more physical processors configured by machine-readable instructions. Executing the machine-readable instructions may cause the one or more physical processors to generate videos using animation and/or motion capture scene information. The machine-readable instructions may include one or more of a user interface component, a timing component, a rendering component, a video component, and/or other components.

The user interface component may be configured to effectuate presentation of one or more user interfaces on one or more computing platforms associated with users of the system. A given user interface may be configured to receive user entry and/or selection of parameter values for one or more video parameters. Video parameters may include one or more of timing parameters, rendering parameters, and/or other parameters. By way of non-limiting example, the user-provided parameter values may include a first parameter value for a first timing parameter, a second parameter value for a first rendering parameter, and/or other user-provided values for other video parameters.

In some implementations, user-provided parameter values for timing parameters may facilitate determining a selection of frames of a video from scene information. Individual frames may comprise an image determined from the scene information.

In some implementations, user-provided parameter values for rendering parameters facilitate determining one or more visual aspects of individual images for individual frames to facilitate rendering images from scene information.

The timing component may be configured to determine time instances along a timeline of scene information based on one or more user-provided parameter values for one or more timing parameters. Individual time instances may correspond to individual frames of a video. In some implementations, the timing component may be configured to determine a first time instance based on the first parameter value for the first timing parameter. The first time instance may correspond to a first frame of the video.

The rendering component may be configured to obtain spatial information for individual frames, render images for individual frames based on the obtained spatial information and/or one or more user-provided parameter values for one or more rendering parameters, and/or perform more or fewer operations. Spatial information may be obtained for individual frames based on corresponding time instances for those frames. A first image may be rendered for the first frame based on the first spatial information, the second parameter value for the first rendering parameter, and/or other information.

The video component may be configured to generate videos using rendered images based on one or more user-provided parameter values for one or more video parameters, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
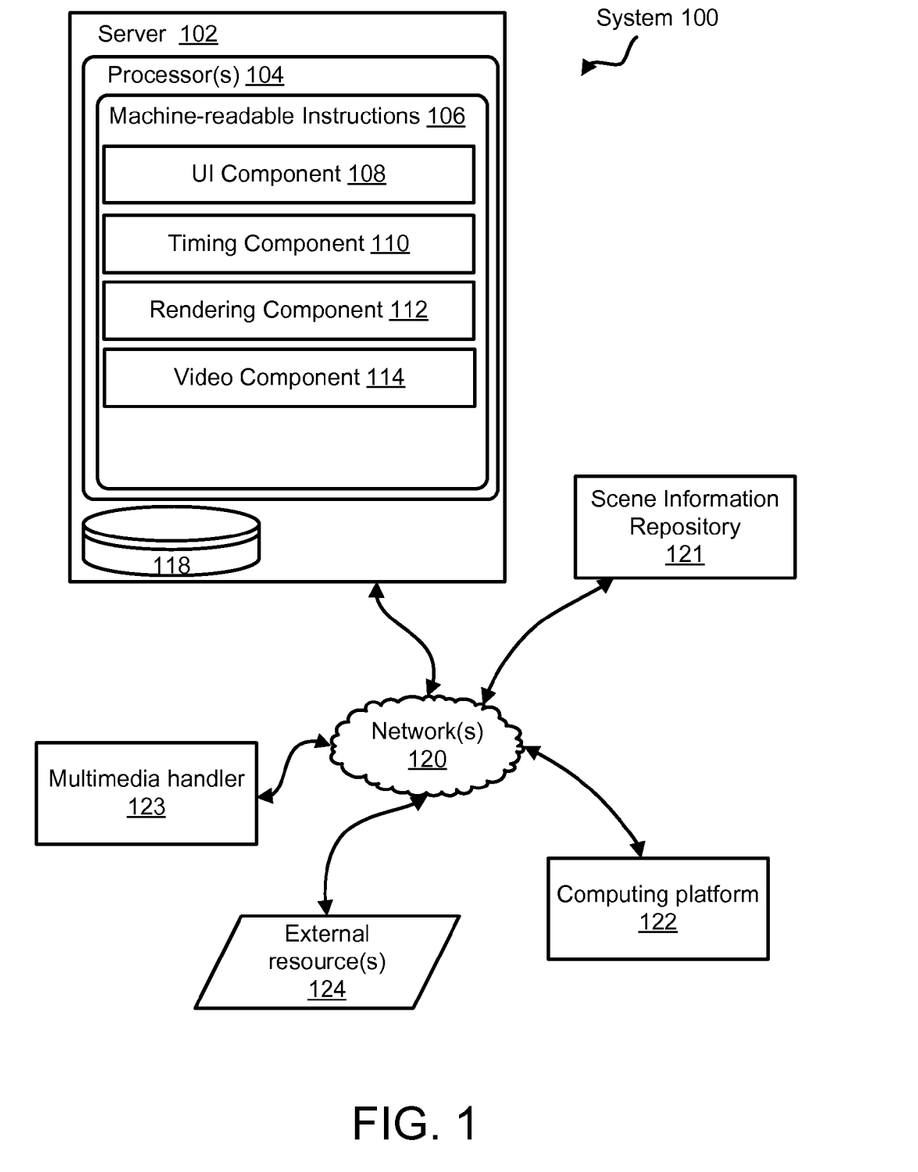
FIG. 1 illustrates a system configured for generating videos using animation and/or motion capture scene information, in accordance with one or more implementations.

FIG. 1 illustrates a system 100 configured for generating videos using animation and/or motion capture scene information, in accordance with one or more implementations. In some implementations, system 100 may comprise one or more of a server 102, electronic storage 118, a scene information repository 121, a multimedia handler 123, one or more computing platforms 122, one or more external resources 124, and/or other components. Server 102 may include one or more physical processors 104 configured by machine-readable instructions 106. Executing machine-readable instructions 106 may cause processor(s) 104 to generate videos using animation and/or motion capture scene information. Machine-readable instructions 106 may include one or more of a user interface component 108 (abbreviated "UI Component 108" in FIG. 1), a timing component 110, a rendering component 112, a video component 114, and/or other components.

In some implementations, server 102 may be configured to provide remote hosting of features and/or functions of machine-readable instructions 106 to one or more computing platforms 122. Computing platforms 122 may be remotely located from server 102. However, in some implementations, one or more features and/or functions of server 102 may be attributed as features and/or functions of one or more computing platforms 122. By way of non-limiting example, individual ones of computing platforms 122 may include machine-readable instructions comprising the same or similar components as machine-readable instructions 106 of server 102. Individual ones of computing platforms 122 may be configured to execute one or more components of the machine-readable instructions 106 using one or more physical processors of individual ones of computing platforms 122. Computing platforms 122 may include, for example, a cellular telephone, a smartphone, a laptop, a tablet computer, a desktop computer, a television set-top box, a smart TV, a gaming console, and/or other platforms.

Scene information may describe views of a computer-generated animation including one or more virtual objects within a virtual space. In some implementations, scene information may comprise information generated by one or more of computer animation techniques, motion capture techniques, and/or other techniques. For example, in some implementations, at least some of the scene information may be determined from motion capture of one or more real-world objects. Captured motion may be translated to corresponding motion of one or more of the virtual objects within the virtual space. For example, motion capture techniques such as one or more of an passive optical system, active optical system, active marker system, semi-passive imperceptible marker system, markerless system, inertial motion capture, and/or other techniques may be used to translate real-world motion to motion of a virtual object within a virtual space.

In some implementations, scene information may comprise one or more of spatial information, temporal information, and/or other information. Spatial information may describe one or more of a computer-generated model of a virtual space; virtual objects present in the virtual space; changes in position, location, orientation, and/or other attributes of virtual objects over time; a viewpoint within the model; and/or other information.

A model of a virtual space may comprise a simulated space described by its boundaries, topography, simulated physical phenomena (e.g., wind, rain, earthquakes, and/or other phenomena), and/or other elements within the virtual space. The topography may be a two-dimensional topography, three-dimensional topography, and/or configured in other ways. The topography may include dimensions of the space, and/or surface features of a surface or objects within the virtual space. In some instances, the topography may describe a surface (e.g., a ground surface) that runs through at least a substantial portion of the space.

Virtual objects may comprise one or more of a moving object, a stationary object, and/or other objects within the virtual space. Virtual objects may be described by geometry, size, color, movement, anatomy, transparency, and/or other attributes. A virtual object may comprise one or more of a virtual character, a topographical element, and/or other objects.

Temporal information may include a timeline and/or other information. A timeline may include one or more of a reference start time (e.g., time "zero" and/or other reference time), a reference ending time (e.g., a duration from the reference start time and/or other reference time), and/or other time instances along the timeline. Time instances along a timeline may correspond to the spatial information. For example, time instances along the timeline may correspond to given positions and/or orientations of one or more virtual objects with the virtual space.

In some implementations, an animated video may be generated using scene information and/or other information. A given video may have multiple frames, a sound track, and/or other components. Individual frames may comprise a two-dimensional image. A two-dimensional image may be generated from spatial information corresponding to a given time instance that depicts one or more virtual objects within a virtual space. By way of non-limiting example, a two-dimensional image may be rendered from the three-dimensional model of the virtual space by taking a "snapshot" of the model at a given time instance alone a timeline. Individual images may be generated at intervals along a timeline to form multiple frames of a video. A set of images may be compiled together to form the animated video.

In some implementations, scene information may be stored in the scene information repository 121 and/or other storage locations. In some implementations, the scene information repository 121 may store different instances of scene information. A given instance of scene information may correspond to a given virtual space, a set or sets of virtual objects, storylines, and/or other information. By way of non-limiting example, scene information for a first virtual space may be stored in scene information repository 121 as first scene information, scene information for a second virtual space may be stored as second scene information, and/or other scene information may be stored individually as discrete information within a storage location.

In some implementations, scene information may include predefined parameter values for one or more video parameters. One or more predefined video parameters may correspond to a "default" and/or a predetermined video generated from the scene information. By way of non-limiting example, scene information may include a predetermined number of frames and/or frame range of a video, a frame rate, a resolution, and/or other values for other video parameters. One or more implementations of the system 100 herein may be configured to allow a user to modify one or more predetermined parameter values and/or provide additional parameter values by entering and/or selecting desired parameter values via a user interface (e.g., via user interface component 108 and/or other components) to generate a video.

In some implementations, the user interface component 108 may be configured to effectuate presentation of a user interface on a computing platform 122 associated with a user, obtain information from user entry and/or selection of parameter values and/or other information via the user interface, and/or perform other operations.

User-provided parameter values for video parameters may facilitate generating a video from scene information. In some implementations, video parameters may include one or more of timing parameters, rendering parameters, output parameters, and/or other parameters.

In some implementations, user-provided parameter values for timing parameters may facilitate determining a selection of frames for a video from scene information. Timing parameters may comprise information providing timing specifications for a video. By way of non-limiting example, timing parameters may include one or more of a frame range, a frame rate, a time range, and/or other timing parameters. By way of non-limiting example, selecting a frame range may allow a user to select one or more parts of a predefined frame range associated with the scene information for which they desire to generate a new video. A frame range may comprise a reference starting frame, a reference ending frame, and/or other frames. Selecting a time range may allow a user to select one or more parts of scene information for which they desire to generate a new video. A time range may comprise a reference starting time, a reference ending time, and/or other time specifications.

In some implementations, user-provided parameter values for timing parameters may facilitate determining one or more frames a video. Determining frames from scene information may comprise determining time instances along a timeline associated with scene information (e.g., via timing component 110 and/or other components). For example, frames may be determined to correspond to individual determined time instances such that a given frame image may be "captured" from spatial information at corresponding time instances.

In some implementations, user-provided parameter values for rendering parameters may facilitate rendering images for individual frames (e.g., via rendering component 112 and/or other components). Rendering images from scene information may comprise one or more of obtaining spatial information for a given time instance along a timeline of the scene information, determining visual attributes of an image, applying one or more rendering passes for an image based on the visual attributes of the image, and/or other operations. Rendering parameters may be associated with one or more visual attributes of an image. Visual attributes may include one or more of an image resolution, a color attribute, a visual effect attribute, and/or other attributes. In some implementations, a color attribute may correspond to one or more of a pixel color, a color map, scene color, subsurface color, and/or other attributes. In some implementations, a visual effect attribute may correspond to one or more of diffuse illumination, antialiasing, reflections, highlights, shadows, image tiling, simulated material properties, depth map, and/or other attributes.

In some implementations, user-provided parameter values for rendering parameters may facilitate rendering images for individual frames by performing one or more rendering passes for individual images based on the user-provided parameter values for one or more rendering parameters (e.g., via rendering component 112). By way of non-limiting example, rendering passes may include one or more of Beauty, Alpha, Depth, Base Color, Decal Mask, Shading Model, Material Ambient Occlusion, Metallic, Opacity, Roughness, Scene Color, Separate Translucency RGB, Separate Translucency Alpha, Specular, Subsurface Color, World Normal, Ambient Occlusion, and/or other rendering passes.

In some implementations, one or more rendering parameters may correspond to a given rendering pass. For example, a first rendering parameter, a second rendering parameter, and/or other rendering parameters may correspond to a first rendering pass. By way of non-limiting example, rendering parameters related to one or more color attributes, visual effect attributes, and/or other visual attributes may correspond to a Beauty pass and/or other rendering passes. By way of non-limiting example, a Beauty pass may be related to a full color rendering including one or more of diffuse illumination (e.g., visual effect attribute), color (e.g., color attribute), and/or other visual attributes.

In some implementations, user-provided parameter values for output parameters may facilitate generating a video using rendered images. Output parameters may correspond to storage attributes of a video generated by multiple images. Storage attributes may include one or more of a file format, a file save location, and/or other information. File formats may include one or more of BMP, EXR, PNG, TIF, TIFF, MPEG, MPEG4, H.264, QTRLE, and/or other file formats. A file save location may comprise a network location for storing a video file.

A user interface may be configured to receive user entry and/or selection of parameter values for video parameters and/or other information. A user interface may include one or more user interface elements. A user interface element may include one or more of an input element, a navigation element, a display element, and/or other elements. An input element may be configured to receive user entry and/or selection of information by a user via one or more input devices of a computing platform 122. For example, an input device may include one or more of a keyboard, a touchscreen, a microphone (e.g., facilitating voice input), a camera (e.g., facilitating gesture input), and/or other input devices. An input element of a user interface may comprise one or more of a text-input field, a drop-down list, a list box, a checkbox, a search field, a button, and/or other input elements. A navigation element may be configured to facilitate navigating between different pages, views, and/or other parts of a user interface. A navigation element may include one or more of a breadcrumb, a slider, pagination, a page, a tab, an icon, an image carousel, and/or other navigation elements. A display element may be configured to present information to a user via the user interface. A display element may include one or more of a window, a preview area, a status bar, and/or other components.

In some implementations, a user interface may be configured to receive user entry and/or selection of particular scene information from which a video may be generated. By way of non-limiting example, a user interface element may be configured to receive user entry and/or selection of particular scene information stored within scene information repository 121 and/or other storage location.

In some implementations, a display element of a user interface may be configured to present a rendering preview and/or other information. The rendering preview may be determined by the rendering component 112 and/or other components. A rendering preview may include a display of individual frames of a video being rendered in accordance with the user entered and/or selected parameter values for one or more video parameters.

In some implementations, a display element of a user interface may be configured to present a rendering queue and/or other information. A rendering queue may comprise one or more lists of one or more frames and/or videos currently being rendered, a status regarding individual frames and/or videos, and/or other information. For example, a rendering queue may include a list including a name of a video project currently being rendered based on user-provided parameter values for video parameters, a status of the rendering of individual frame images, and/or other information.

Figure 2:
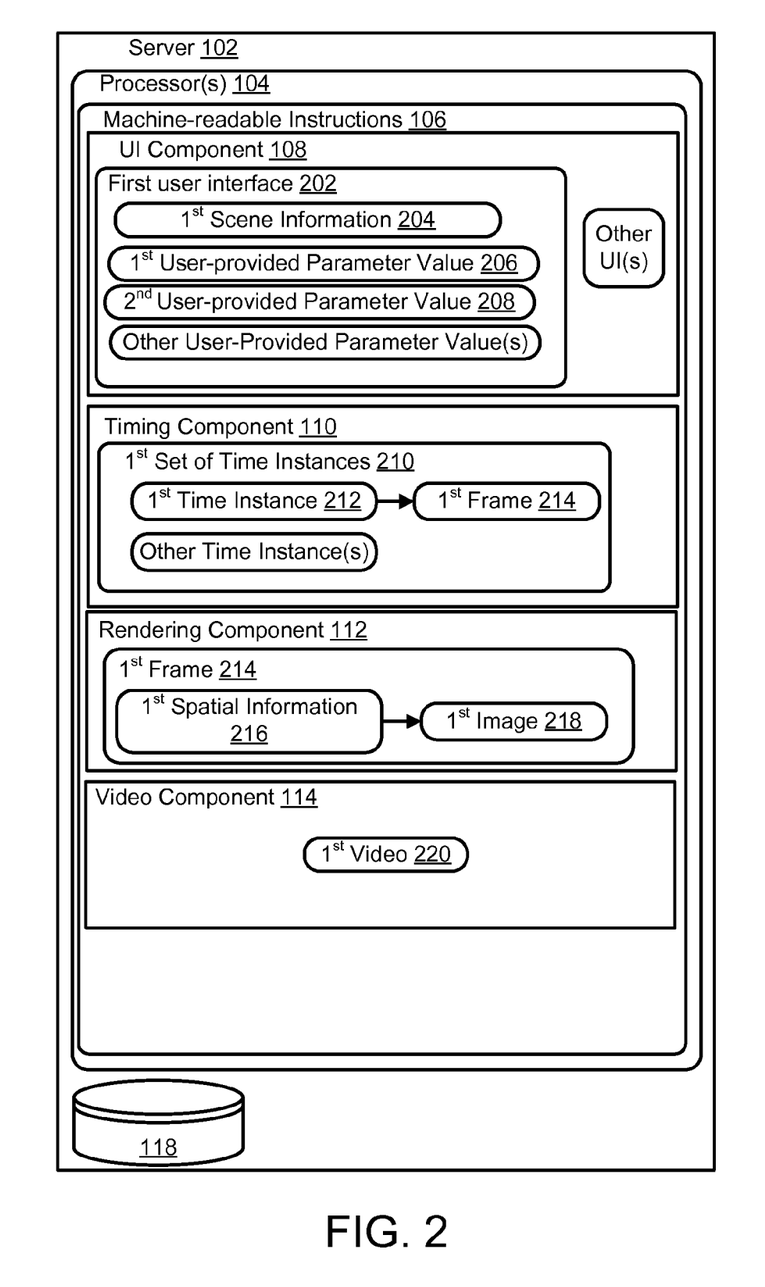
FIG. 2 illustrates an implementation of a server employed in the system of FIG. 1.

By way of non-limiting illustration in FIG. 2, the user interface component 108 may be configured to effectuate presentation of a first user interface 202 on a first computing platform associated with a first user (not shown in FIG. 2) and/or other user interfaces on other computing platforms. The user interface component 108 may be configured to obtain, via the first user interface 202, entry and/or selection of first scene information 204, a first user-provided parameter value 206 for a first timing parameter, a second user-provided parameter value 208 for a first rendering parameter, other parameter values for one or more other video parameters, and/or other information. The first scene information 204 may be stored in scene information repository 121 (not shown in FIG. 2), and/or other storage location. The first scene information 204 may include first spatial information 216 and/or other spatial information (e.g., to be obtained by the rendering component 112), first temporal information and/or other temporal information (e.g., to be obtained by timing component 110), and/or other information. The first temporal information may include a first time instance 212 and/or other time instances alone a timeline of the first scene information 204. The first spatial information 216 may correspond to the first time instance 212.

Returning to FIG. 1, the timing component 110 may be configured to determine time instances along a timeline of given scene information based on one or more user-provided parameter values for one or more timing parameters. Individual time instances may correspond to individual frames of a video to be generated. By way of non-limiting example, a user-provided parameter value for a timing parameter related to one or more of frame range, time range, frame rate, and/or other timing specification may facilitate determining time instances along a timeline. For example, a first user-provided parameter value for a first timing parameter may facilitate determining a first time instance along a timeline of scene information. The first time instance may correspond to a first frame.

In some implementations, a user-provided parameter value for a timing parameter related to frame rate may facilitate determining time instances along a timeline. Frame rate may facilitate determining intervals of time along a timeline where individual images may be determined from scene information. The scene information may include a predefined length of time measured by its timeline (e.g., including a reference start time and/or a reference end time). A first frame may correspond to spatial information associated with the reference start time and/or other time instance. Given a fixed time length of the scene information, a user-provided frame rate may determine intervals along the timeline that may correspond to different frames of a video. For example, a first user-provided parameter value for a timing parameter related to frame may determine a set of time instances along a timeline that are spaced at intervals determined by the parameter value. By way of non-limiting example, based on a user-provided frame rate of "Y frames per unit of time," time instances may be determined for 1/Y unit of time intervals along the timeline starting with a reference start time. By way of non-limiting example, based on a user-provided frame rate of "24 frames per second," time instances starting with a reference start time and intervals of 1/24 seconds from the reference start time to the reference end time may be determined (e.g., 0 seconds, 1/24 seconds, 2/24 seconds, 3/24 seconds, etc.).

In implementations where scene information includes a default frame range and/or frame rate, time instances corresponding to individual ones of the default frames may be known. For example, for scene information associated with a first set of frames and a first frame rate, individual time instances for individual ones of the frames in the set of frames may be known. By way of non-limiting example, based on a default setting of "X" quantity of frames (e.g., labeled frame 1 to frame "X") and "Y frames per unit of time" frame rate, individual frames may correspond to 1/Y unit of time intervals along a timeline starting from a reference start time and ending at a reference end time. A user-provided parameter value for a timing parameter related to frame range may allow a user to "crop" the default frames into a new frame range, wherein time instances for the "cropped" set of frames may be known and/or determined.

By way of non-limiting example, a user may provide a parameter value for a timing parameter related to frame range which may include one or more of a starting frame, an ending frame, and/or other frames. The user-provided frame range may comprise a part, or subset, of a default frame range associated with scene information. In some implementations, absent a user-provided frame rate, a default frame rate may be utilized.

In some implementations, a user-provided parameter value for a timing parameter related to time range may facilitate determining time instances along a timeline. For example, similar to the frame "cropping" implementation where a user provides a frame range, a user may provide a time range to "crop" a set of default frames to a given subset of those frames based a new selected time range that encompasses those frames.

In some implementations, a user may provide a combination of one or more of a frame range, a time range, a frame rate, and/or other values for one or more other timing parameters. By way of non-limiting example, a user-provided frame range may crop a default frame range. A reference starting frame and/or reference ending frame may be known and/or determined. However, if a user concurrently provides a frame rate, one or more intermediate frames within the frame range may be determined to accommodate for the new frame rate. Time instances between a reference starting time instance associated with the reference starting frame and a reference ending time instance associated with the reference ending frame may be determined based on a user-provided frame rate. For example, intermediate time instances between the reference starting time and reference ending time may be determined based on time intervals in accordance with a user-provided frame rate. Other combinations of user-provided parameter values for one or more timing parameters may facilitate determining time instances in other ways.

By way of non-limiting illustration in FIG. 2, the timing component 110 may be configured to determine a first set of time instances 210 that correspond to a first set of frames of a first video 220 (e.g., to be generated by the video component 114). The first set of time instances 210 may comprise time instances spaced along a timeline in accordance with one or more user-provided parameter values for one or more timing parameters. By way of non-limiting example, the first set of time instances 210 may comprise a reference start time, a reference end time, and/or one or more intermediate time instances. Intermediate time instances may be determined based on one or more of a user-provided frame range, frame rate, time range, and/or other timing parameter. By way of non-limiting example, the timing component 110 may be configured to determine a first time instance 212 and/or other time instances within the first set of time instances 210. The first time instance 212 may correspond to a first frame 214 of the first video 220. The first time instance 212 may be determined based on the first user-provided parameter value 206 for the first timing parameter, and/or other parameter values for other timing parameters.

Returning to FIG. 1, the rendering component 112 may be configured to obtain spatial information based on time instances determined for individual frames, render images for individual frames based on the obtained spatial information for individual frames and/or one or more user-provided parameter values for one or more rendering parameters, and/or perform more or fewer operations. The obtained spatial information may be used to generate two-dimensional images for individual frames. A given time instance along a timeline may correspond to given spatial information. The given spatial information at the given time instance may comprise a "snapshot" of the three-dimensional virtual space model that may be used to generate a two-dimensional image for a frame.

In some implementations, rendering images for individual frames based on one or more user-provided parameter values for one or more rendering parameters may comprise performing one or more rendering passes over individual images. In some implementations, a given rendering pass may correspond to one or more rendering parameters. For example, a first rendering pass may correspond to one or more user-provided parameter values for one or more rendering parameters. By way of non-limiting example, a first rendering pass may correspond to one or more user-provided parameter values for rendering parameters related to one or more of a resolution, a color attribute, a visual effect attribute, and/or other attributes related to rendering parameters.

By way of non-limiting example, a Beauty pass may correspond to one or more user-provided parameter values for one or more rendering parameters. By way of non-limiting example, a Beauty pass may include a full-color rendering and/or other types of renderings corresponding to one or more user-provided parameter values of rendering parameters. Other rendering passes may be performed that correspond to one or more other user-provided parameter values for one or more rendering parameters.

In some implementations, the rendering component 112 may be configured to effectuate presentation of a rendering preview in a display element on a user interface. A rendering preview may correspond to one or more currently rendering and/or previously rendered images for individual frames of a video. By way of non-limiting example, a rendering preview may depict an image for a given frame as one or more rendering passes are performed for the image.

By way of non-limiting illustration in FIG. 2, the rendering component 112 may be configured to obtain first spatial information 216 for the first frame 214 and/or other spatial information for other frames. The first spatial information 216 may correspond to the first time instance 212. The rendering component 112 may be configured to render a first image 218 for the first frame 214 using the first spatial information 216 and/or other images for other frames based on other spatial information. The first image 218 may be rendered based on the second user-provided parameter value 208 for the first rendering parameter and/or other user-provided parameter values for other rendering parameters.

Returning to FIG. 1, the video component 114 may be configured to generate one or more videos using rendered images, soundtracks, and/or other information. A given video may be generated based on one or more user-provided parameter values for one or more video parameters, and/or other information. In some implementations, the video component 114 may be configured such that one or more video parameters used for generating video include one or more of a timing parameter, an output parameter, and/or other parameters.

In some implementations, the video component 114 may be configured such that generating videos comprises one or more of formatting images to a video format, renumbering frames, correcting paths between frames, timing playback of frames, and/or other operations.

In some implementations, video component 114 may comprise and/or utilize multimedia handler 123 and/or other components of system 100. In some implementations, multimedia handler 123 may comprise storage media storing machine-readable instructions configured to perform one or more operations of video component 114. By way of non-limiting example, the multimedia handler 123 may include one or more of an ffmpeg software project, and/or other components.

In some implementations, formatting images may be based on a user-provided parameter value for an output parameter related to file format.

In some implementations, timing playback of the frames of the video may be based on a user-provided parameter value for a timing parameter related to frame rate. For example, the video may be generated to play back one or more associated frames at a rate determined by a user-provided frame rate. In some implementations, absent a user-provided frame rate, a default frame rate may be utilized By way of non-limiting illustration in FIG. 2, the video component 114 may be configured to generate the first video 220 using the first image 218 and/or other rendered images for frames of the first video 220. The video component 114 may be configured such that the first video 220 may be generated based on one or more of the first user-provided parameter values 206 for the first timing parameter, other user-provided parameter values for other video parameters, and/or other information. Other information may include default settings and/or other information.

Figure 3:
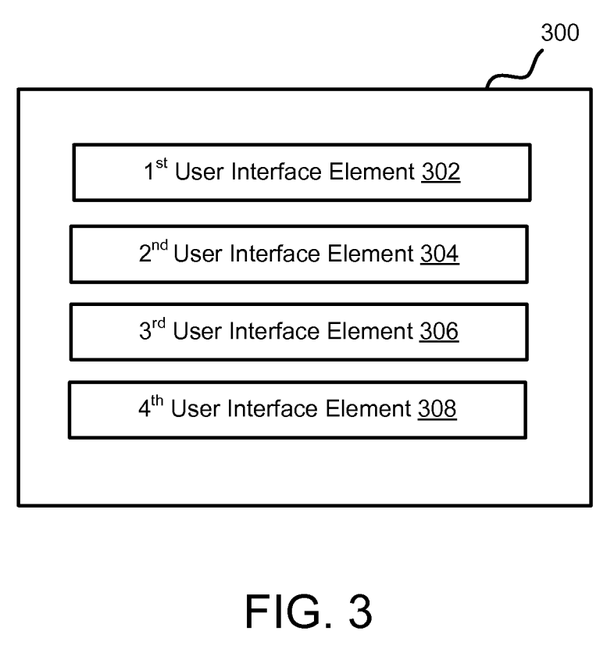
FIG. 3 illustrates an exemplary implementation of a user interface of the system of FIG. 1.

FIG. 3 illustrates an exemplary implementation of a user interface 300 configured to receive user entry and/or selection of parameter values for one or more video parameters and/or other information. The user interface 300 may be presented on a display of a computing platform 122 (not shown in FIG. 3). The user interface 300 may include one or more of a first user interface element 302, a second user interface element 304, a third user interface element 306, a fourth user interface element 308, and/or other user interface elements. The first user interface element 302 may correspond to an input element configured to receive user entry and/or selection of scene information from which a video may be generated. The second user interface element 304 may correspond to an input element configured to receive user entry and/or selection of a parameter value for a first timing parameter. The third user interface element 306 may correspond to an input element configured to receive user entry and/or selection of a parameter value for a first rendering parameter. The fourth user interface element 308 may correspond to an input element configured to receive user entry and/or selection of an option to submit and/or save their entered and/or selected parameter values.

It is noted that the above description of user interface 300 is provided for illustrative purposes only and is not intended to be limiting. For example, in other implementations, the user interface 300 may include more or fewer user interface elements, and/or other components.

Figure 4:
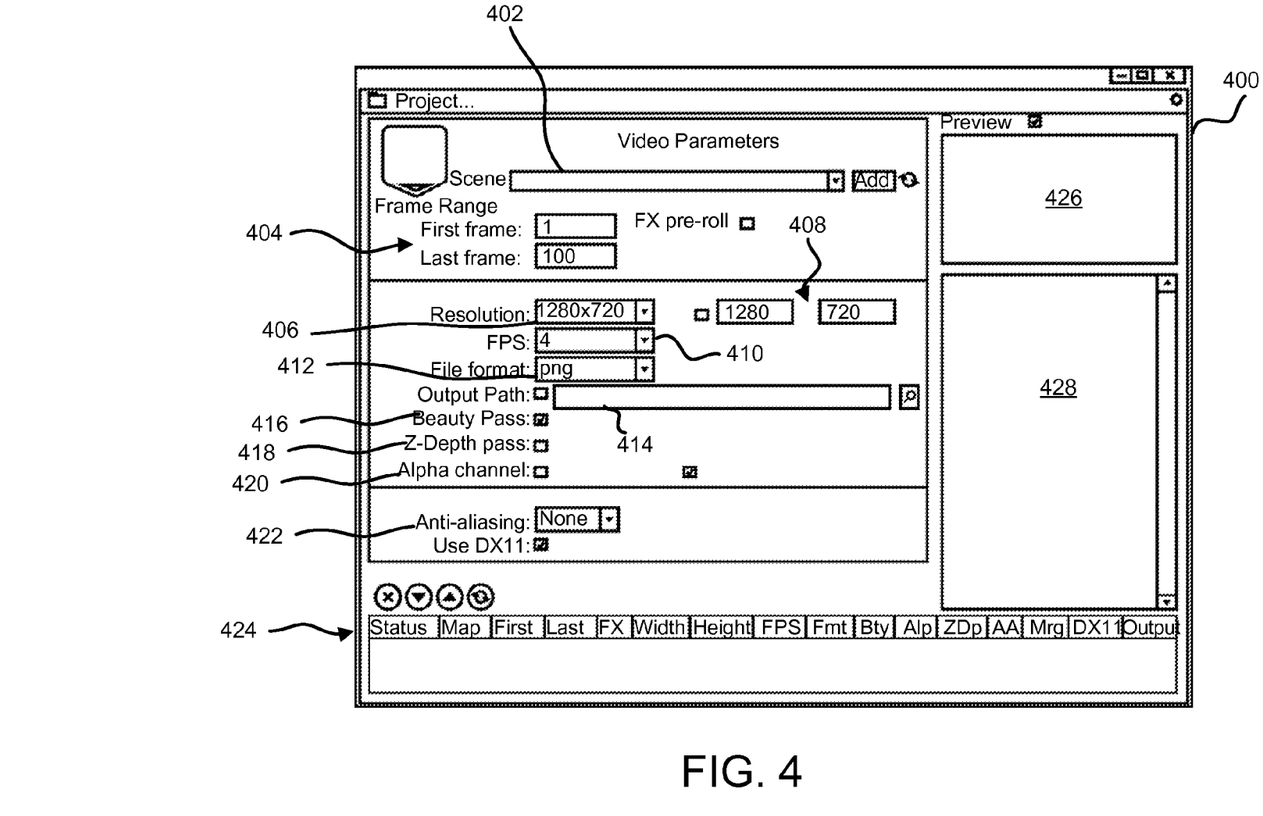
FIG. 4 illustrates another exemplary implementation of a user interface of the system of FIG. 1.

FIG. 4 illustrates another exemplary implementation of a user interface 400 configured to receive user entry and/or selection of parameter values for one or more video parameters and/or other information. The user interface 400 may be presented on a display of a computing platform 122 (not shown in FIG. 4). The user interface 400 may include one or more of a first user interface element 402, a second user interface element 404, a third user interface element 406, a fourth user interface element 408, a fifth user interface element 410, a sixth user interface element 412, a seventh user interface element 414, an eighth user interface element 416, a ninth user interface element 418, a tenth user interface element 420, an eleventh user interface element 422, a twelfth user interface element 424, a thirteenth user interface element 426, a fourteenth user interface element 428, and/or other user interface elements.

The first user interface element 402 may correspond to an input element configured to receive user entry and/or selection of scene information from which a video may be generated. For example, the first user interface element 402 may comprise a drop-down list including scene information available for selection by a user.

The second user interface element 404 may correspond to a set of input elements configured to receive user entry and/or selection of a parameter value for a first timing parameter. The first timing parameter may correspond to a frame range, and/or other timing parameter. The second user interface element 404 may include a first input element configured to receive user entry and/or selection of a starting frame in a frame range, a second input element configured to receive user entry and/or selection of an ending frame in a frame range, and/or other input elements. By way of non-limiting example, the second user interface element 404 may comprise a set of text input fields and/or other input elements.

The third user interface element 406 may correspond to an input element configured to receive user entry and/or selection of a parameter value for a first rendering parameter. The first rendering parameter may correspond to a video resolution, and/or other rendering parameter. By way of non-limiting example, the third user interface element 406 may comprise a drop-down list and/or other input elements.

The fourth user interface element 408 may correspond to a set of input elements configured to receive user entry and/or selection of parameter values for the first rendering parameter. The fourth user interface element 408 may be an alternative technique to input a video resolution (e.g., alternative to third user interface element 406). The fourth user interface element 408 may include a first input element configured to receive user entry and/or selection of a first resolution measure (e.g., in pixels and/or other units), a second input element configured to receive user entry and/or selection of a second resolution measure, and/or other input elements. By way of non-limiting example, the first and second input elements may comprise text input fields and/or other input elements.

The fifth user interface element 410 may correspond to an input element configured to receive user entry and/or selection of a parameter value for a second timing parameter. The second timing parameter may correspond to a frame rate (e.g., in frames per second (FPS), and/or other unit of rate), and/or other timing parameter. By way of non-limiting example, the fifth user interface element 410 may comprise a drop-down list and/or other input elements.

The sixth user interface element 412 may correspond to an input element configured to receive user entry and/or selection of a parameter value for a first output parameter. The first output parameter may correspond to a file format, and/or other output parameter. By way of non-limiting example, the sixth user interface element 412 may comprise a drop-down list and/or other input elements.

The seventh user interface element 414 may correspond to an input element configured to receive user entry and/or selection of a parameter value for a second output parameter. The second output parameter may correspond to a file save location, and/or other output parameter. By way of non-limiting example, the seventh user interface element 414 may comprise a search field and/or other input elements.

The eighth user interface element 416 may correspond to an input element configured to receive user entry and/or selection of a parameter value for a second rendering parameter. The second rendering parameter may correspond to a first color attribute, and/or other attributes. For example, the first visual effect attribute may correspond to color, diffuse illumination, and/or other attributes (e.g., corresponding to a Beauty pass during rendering). By way of non-limiting example, the eighth user interface element 416 may comprise a checkbox and/or other input elements.

The ninth user interface element 418 may correspond to an input element configured to receive user entry and/or selection of a parameter value for a third rendering parameter. The third rendering parameter may correspond to a depth map (e.g., corresponding to a Z-depth pass during rendering). By way of non-limiting example, the ninth user interface element 418 may comprise a checkbox and/or other input elements.

The tenth user interface element 420 may correspond to an input element configured to receive user entry and/or selection of a parameter value for a fourth rendering parameter. The fourth rendering parameter may correspond to transparency of one or more colors in an image (e.g., corresponding to an Alpha channel), and/or other output parameter. By way of non-limiting example, the tenth user interface element 420 may comprise a checkbox and/or other input elements.

The eleventh user interface element 422 may correspond to an input element configured to receive user entry and/or selection of a parameter value for a fifth rendering parameter. The fifth rendering parameter may correspond to correcting distortions and/or artifacts present in an image (e.g., referred to as anti-aliasing), and/or other rendering parameter. By way of non-limiting example, the eleventh user interface element 422 may comprise a drop-down list and/or other input elements.

The twelfth user interface element 424 may correspond to a set of navigation elements.

The thirteenth user interface element 426 may correspond to a display element configured to present information to a user. By way of non-limiting example, the thirteenth user interface element 426 may comprise a display window configured to present a rendering preview (e.g., determined via rendering component 112) and/or other information.

The fourteenth user interface element 428 may correspond to a display element configured to present information to a user. By way of non-limiting example, the fourteenth user interface element 428 may comprise a display window configured to present a status regarding renderings of individual frames and/or videos and/or other information.

Figure 5:
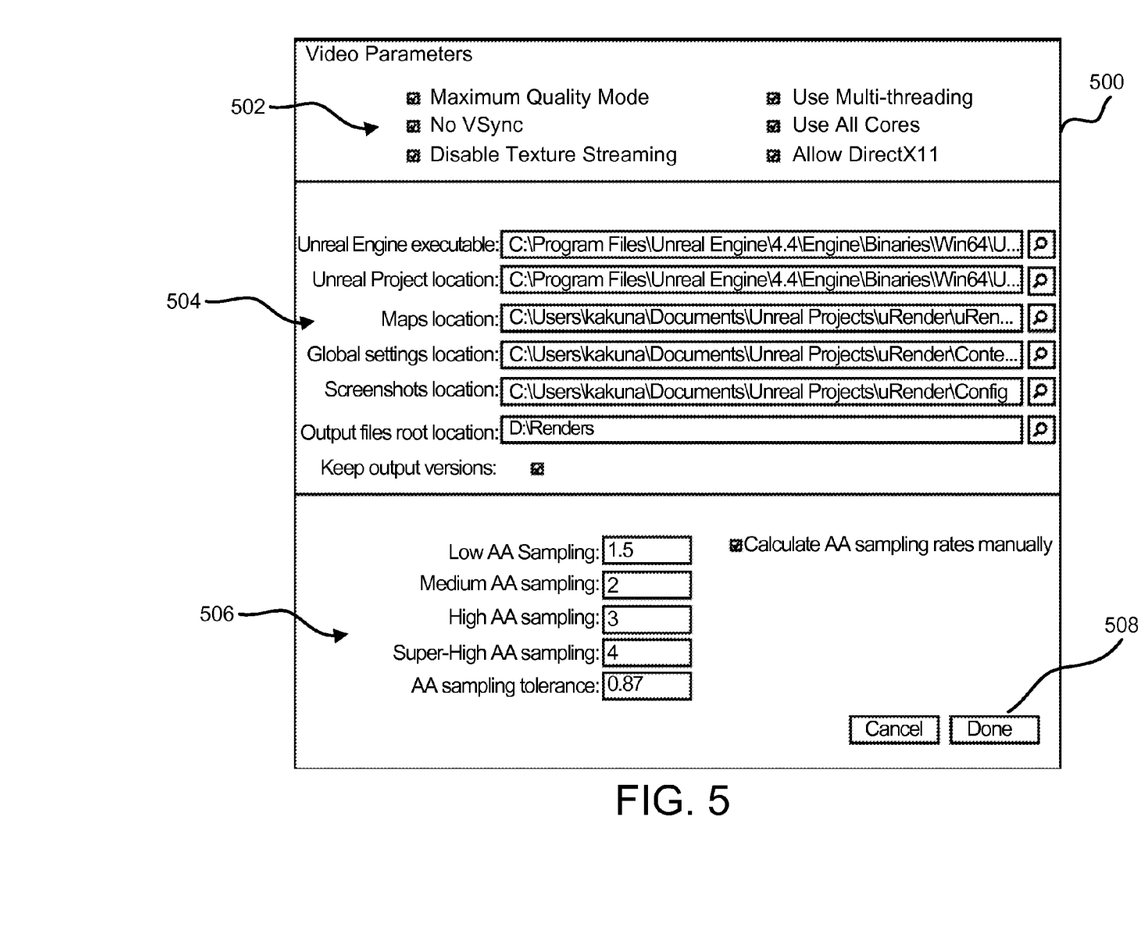
FIG. 5 illustrates yet another exemplary implementation of a user interface of the system of FIG. 1.

FIG. 5 illustrates yet another exemplary implementation of a user interface 500 configured to receive user entry and/or selection of parameter values for one or more video parameters and/or other information. The user interface 500 may be presented on a display of a computing platform 122 (not shown in FIG. 5). In some implementations, the user interface 500 may be obtained by a user via one or more of the navigation elements in the set of navigation elements of the twelfth user interface element 424 of user interface 400 in FIG. 4. The user interface 500 may include one or more of a first user interface element 502, a second user interface element 504, a third user interface element 506, a fourth user interface element 508, and/or other user interface elements.

The first user interface element 502 may correspond to a set of input elements configured to receive user entry and/or selection of one or more parameter values for one or more rendering parameters.

The second user interface element 504 may correspond to a set of input elements configured to receive user entry and/or selection of one or more parameter values for one or more output parameters.

The third user interface element 506 may correspond to a set of input elements configured to receive user entry and/or selection of one or more parameter values for one or more rending parameters.

The fourth user interface element 508 may correspond to one or more input elements configured to receive user entry and/or selection of an option to submit and/or save their entered and/or selected parameter values.

Returning to FIG. 1, server 102, computing platform(s) 122, multimedia handler 123, scene information repository 121, and/or external resource(s) 124 may be operatively linked via one or more electronic communication links. For example, such electronic communication links may be established, at least in part, via a network 120 such as the Internet and/or other networks. It will be appreciated that this is not intended to be limiting and that the scope of this disclosure includes implementations in which server 102, computing platform 122, multimedia handler 123, scene information repository 121, and/or external resources 124 may be operatively linked via some other communication media.

External resource(s) 124 may include sources of information, hosts, external entities participating with system 100, and/or other resources. In some implementations, some or all of the functionality attributed herein to external resource(s) 124 may be provided by resources included in system 100.

Server 102 may include electronic storage 118, one or more processors 104, machine-readable instructions 106, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from server 102, information received from computing platform(s) 122, information received from scene information repository 121, information received from multimedia handler 123, and/or other information that enables server 102 to function as described herein.

Processor(s) 104 may be configured to provide information-processing capabilities in server 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, and/or 114. Processor(s) 104 may be configured to execute components 108, 110, 112, and/or 114 by software; hardware; firmware; some combination of software, hardware, and/or firmware; and/or other mechanisms for configuring processing capabilities on processor(s) 104.

It should be appreciated that although components 108, 110, 112, and/or 114 are illustrated in FIG. 1 as being co-located within a single processing unit, in implementations in which processor(s) 104 includes multiple processing units, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114, and/or other components. As another example, processor(s) 104 may be configured to execute one or more additional components that may perform some or all of the functionality attributed below to one of components 108, 110, 112, and/or 114.

Figure 6:
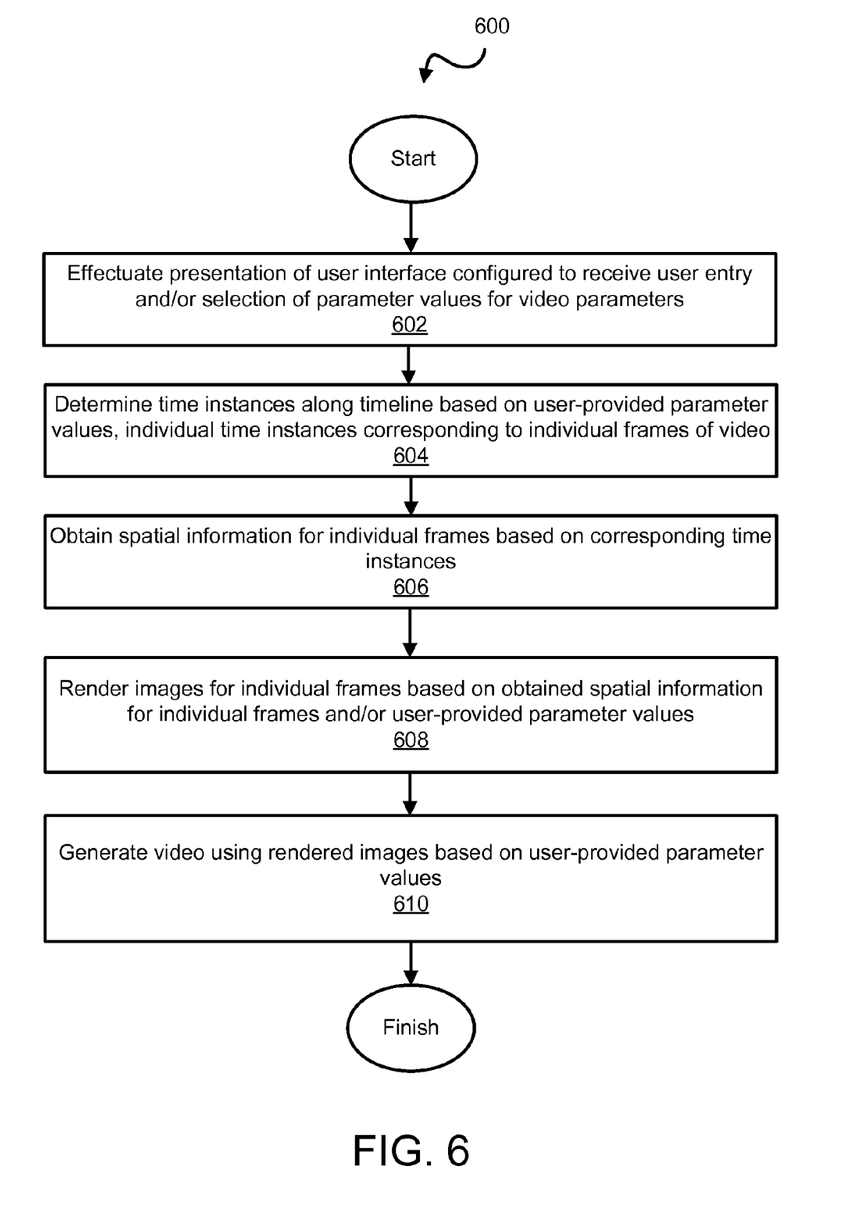
FIG. 6 illustrates a method of generating videos using animation and motion capture scene information, in accordance with one or more implementations.

FIG. 6 illustrates a method 600 of generating videos using animation and motion capture scene information, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on electronic storage medium. The one or more processing devices may include one or more devices configured through hardware, firmware, and/or software to be specifically designed for execution of one or more of the operations of method 600.

At an operation 602, a user interface configured to receive user entry and/or selection of parameter values for video parameters may be presented. In some implementations, operation 602 may be performed by one or more physical processors executing a user interface component the same as or similar to user interface component 108 (shown in FIG. 1 and described herein).

At an operation 604, time instances along a timeline of scene information may be determined based on one or more user-provided parameter values for one or more video parameters. For example, time instances may be determined based on a user-provided parameter value for a timing parameter and/or other video parameter. Individual time instances may correspond to individual frames of a video to be generated. In some implementations, operation 604 may be performed by one or more physical processor executing a timing component the same as or similar to the timing component 110 (shown in FIG. 1 and described herein).

At an operation 606, spatial information may be obtained for individual frames of a video based on corresponding time instances for those frames. In some implementations, operation 606 may be performed by one or more physical processors executing a rendering component the same as or similar to the rendering component 112 (shown in FIG. 1 and described herein).

At an operation 608, individual images may be rendered for individual frames based on obtained spatial information for individual ones of the frames, one or more user-provided parameter values for one or more video parameters, and/or other information. In some implementations, operation 608 may be performed by one or more physical processors executing a rendering component the same as or similar to the rendering component 112 (shown in FIG. 1 and described herein).

At an operation 610, a video may be generated using rendered images for frames of the video based on one or more user-provided parameter values for one or more video parameters and/or other information. In some implementations, operation 610 may be performed by one or more physical processors executing a video component the same as or similar to the video component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating videos using animation and motion capture scene information, the system comprising:

non-transitory storage media storing scene information, the scene information facilitating rendering of images, the scene information including spatial information and corresponding temporal information, the spatial information including positions and/or orientations of virtual objects in a three-dimensional virtual space over time, the temporal information including a timeline of individual time instances corresponding to individual positions and/or orientations of the virtual objects, the scene information including first spatial information describing a first position and/or first orientation of a first virtual object, the first spatial information corresponding to a first time instance, at least some of the scene information being determined from motion capture of one or more real-world objects corresponding to one or more of the virtual objects; and one or more physical processors configured by machine-readable instructions to:

effectuate presentation of a user interface, the user interface being configured to receive user entry and/or selection of parameter values for timing parameters, wherein:

user-provided parameter values for timing parameters facilitate determining a selection of individual frames of a video comprising individual images determined from the scene information, the user-provided parameter values including a first parameter value for a first timing parameter;

identify time instances along the timeline based on the user-provided first parameter value for the first timing parameter, individual time instances corresponding to individual frames of the video, including identifying the first time instance based on the first parameter value, the first time instance corresponding to a first frame of the video;

obtain, from the storage media, spatial information for individual frames based on corresponding time instances identified for those frames, the first spatial information being obtained for the first frame based on the first spatial information corresponding to the first time instance;

render images for individual frames from spatial information obtained for the individual frames by virtue of the individual frames and obtained spatial information corresponding to the same time instance, the rendered images including a first image for the first frame that is rendered from the first spatial information based on the first frame and first spatial information corresponding to the first time instance; and generate the video using the rendered images based on the user-provided parameter values for timing parameters.

2. The system of claim 1, wherein the timing parameters include one or more of a frame range or a frame rate.

3. The system of claim 1, wherein the user interface is further configured to receive user entry and/or selection of parameter values for rendering parameters, wherein user-provided parameter values for the rendering parameters corresponding to visual attributes of individual images for individual frames to facilitate rendering images from the scene information, and wherein the user-provided parameter values include a second parameter value for a first rendering parameter.

4. The system of claim 3, wherein the first image is rendered for the first frame further based on the second parameter value.

5. The system of claim 3, wherein the rendering parameters include one or more of an image resolution, color attribute, or visual effect attribute.

6. The system of claim 5, wherein color attributes corresponds to one or more of scene color, subsurface color, or color maps.

7. The system of claim 5, wherein the visual effect attribute corresponds to one or more of anti-aliasing, illumination, reflections, highlights, shadows, shading, sharpness, depth-of-field, image tiling, opacity, or roughness.

8. The system of claim 1, wherein rendering images for individual frames comprises performing one or more rendering passes over images.

9. The system of claim 1, wherein generating the video using the rendered images comprises converting a file format of individual images to a video file format.

10. The system of claim 1, wherein generating the video using the rendered images comprises timing a playback of individual rendered images based on user-provided parameter values for timing parameters.

11. A method of generating videos using animation and motion capture scene information, the method being implemented on a computer system comprising one or more physical processors and non-transitory storage media storing machine-readable instructions, the method comprising:

storing, in the storage media, scene information, the scene information facilitating rendering images, the scene information including spatial information and corresponding temporal information, the spatial information including positions and/or orientations of virtual objects in a three-dimensional virtual space over time, the temporal information including a timeline of individual time instances corresponding to individual positions and/or orientations of the virtual objects, the scene information including first spatial information describing a first position and/or first orientation of a first virtual object, the first spatial information corresponding to a first time instance, at least some of the scene information being determined from motion capture of one or more real-world objects corresponding to one or more of the virtual objects; and effectuating presentation of a user interface, the user interface being configured to receive user entry and/or selection of parameter values for timing parameters, wherein:
 user-provided parameter values for timing parameters facilitate determining a selection of individual frames of a video comprising individual images determined from the scene information, the user-provided parameter values including a first parameter value for a first timing parameter;

identifying time instances along the timeline based on the user-provided first parameter value for the first timing parameter, individual time instances corresponding to individual frames of the video, including identifying the first time instance based on the first parameter value, the first time instance corresponding to a first frame;

obtaining, from the storage media, spatial information for individual frames based on corresponding time instances identified for those frames, including obtaining the first spatial information for the first frame based on the first spatial information corresponding to the first time instance;

rendering images for individual frames from spatial information obtained for the individual frames by virtue of the individual frames and obtained spatial information corresponding to the same time instance, including rendering a first image of the first frame from the first spatial information based on the first frame and first spatial information corresponding to the first time instance; and generating the video using the rendered images based on the user-provided parameter values for timing parameters.

12. The method of claim 11, wherein the timing parameters include one or more of a frame range or a frame rate.

13. The method of claim 11, wherein the user interface is further configured to receive user entry and/or selection of parameter values for rendering parameters, wherein user-provided parameter values for the rendering parameters correspond to visual attributes of individual images for individual frames to facilitate rendering images from the scene information, and wherein the user-provided parameter values include a second parameter value for a first rendering parameter.

14. The method of claim 13, wherein the first image is rendered for the first frame further based on the second parameter value.

15. The method of claim 13, wherein the rendering parameters include one or more of an image resolution, color attribute, or visual effect attribute.

16. The method of claim 15, wherein color attributes corresponds to one or more of scene color, subsurface color, or color maps.

17. The method of claim 15, wherein the visual effect attribute corresponds to one or more of anti-aliasing, illumination, reflections, highlights, shadows, shading, sharpness, depth-of-field, image tiling, opacity, or roughness.

18. The method of claim 11, wherein rendering images for individual frames comprises performing one or more rendering passes over images.

19. The method of claim 11, wherein generating the video using the rendered images comprises converting a file format of individual images to a video file format.

20. The method of claim 11, wherein generating the video using the rendered images comprises timing a playback of individual rendered images based on user-provided parameter values for timing parameters.

* * * * *